2,809,171
MONOISOPROPYLAMINOBORANE POLYMERS

William Vernon Hough, Butler, Pa., and George W. Schaeffer, Creve Coeur, Mo., assignors, by mesne assignments, to Olin Chemical Co., Inc., a corporation of Delaware No Drawing. Application March 1, 1956,
Serial No. 568,706

6 Claims. (Cl. 260—2)

This invention relates to polymeric materials obtained by thermal treatment of monoisopropylaminoborane and to the process of producing them.

The starting material for the preparation of the novel polymers, monoisopropylaminoborane having the formula $C_3H_7NHBH_2$, may be prepared in several ways known to the art. For example, monoisopropylaminoborane may be prepared by heating monoisopropyl ammonium chloride with lithium borohydride. Monoisopropylaminoborane appears to be an equilibrium mixture of monomer and dimer apparent consisting largely of the dimer when the molecular weight is determined by the depression of the freezing point of benzene and containing larger proportions of the monomer at elevated temperatures.

It is known that when the lower methyl and ethyl homologs of monoisopropylaminoborane are subjected to thermal treatment, they are converted to the corresponding N-trialkylborazines. In contrast to the behavior on heating of methyl and ethyl aminoboranes, we have now found that monoisopropylaminoborane polymerizes at elevated temperatures to produce normally solid polymers having the empirical formula $C_3H_7NBH$. Moreover, we have found that the rate of heating of the monoisopropylaminoborane determines whether the resulting polymer will be crystalline or amorphous in form.

Thus according to our invention, monoisopropylaminoborane is heated to a temperature of about 250–350° C. to produce the novel polymers. No extended holding time at the elevated temperatures is required as only a few minutes suffice. The crystalline polymer of our invention is obtained by heating the monoisopropylaminoborane to reaction temperature within a period of about 5 to 15 minutes. The amorphous polymer of our invention is obtained by heating the monoisopropylaminoborane to reaction temperature within a period of about 45 to 75 minutes.

The new polymers are substantially different in properties from the monomer-dimer isopropylaminoborane mixtures previously known and from the N-trialkylborazines. The molecular weight is unknown since the polymers do not appear to be soluble in any of the solvents commonly used for the determination of molecular weight. However, their very insolubility is evidence of their high molecular weight. The new polymers are generally stable in air, quite insoluble in distilled water or dilute aqueous acid and only slowly attacked by concentrated acids at elevated temperatures. They are excellent electrical insulation and applied, for example, to a wire provide long-lasting covering especially useful in service at elevated temperatures.

The formation of either of the high polymers of the present invention is accompanied by the evolution of hydrogen apparently in accordance with the following equation:

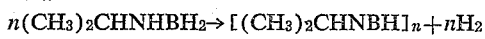

Analyses show $C_3H_7$:N:B:H ratios of 1:1:1:1. Both the loss of hydrogen and the atomic ratio are in contrast to any disclosure known to be in the prior art.

The preparation of the novel products of our invention is illustrated in the examples below. In all of the examples the monoisopropylaminoborane employed was prepared in the following manner.

A mixture of 6.46 grams (0.0676 mole) of isopropylammonium chloride and 2.3 grams (0.1 mole) of lithium borohydride was placed in the bottom of a 300 ml. Kjeldahl flask modified to have a neck 50 cm. in length. The top carried a male standard taper joint and the female joint carried a side arm and a dropping funnel closed to the reaction flask by a stopcock. Sufficient diethyl ether was added to cover the solids. An immediate reaction occurred with evolution of hydrogen amounting to 1 mole per mole of isopropylammonium chloride.

After this reaction the ether was removed by warming in a vacuum. The tube was closed and heated to 120° C. for 30 minutes. The tube was again evacuated and closed. The temperature was then raised to 200° C. for an additional 30 minutes. On opening the tube to the vacuum pump a considerable quantity of N-tri-isopropylborazine was collected in the adjoining trap at a temperature of −196° C. Simultaneously a solid collected on the cool upper walls of the reactor and was identified as monoisopropylaminoborane having the formula $C_3H_7NHBH_2$. Analysis of the monoisopropylaminoborane by hydrolysis gave the following results:

|  | Boron | Nitrogen | Hydrogen (Hydrolyzable) |
|---|---|---|---|
| Calculated for $C_3H_7NHBN_2$ | 15.30 | 19.72 | 2.85 |
| Found | 14.8 | 18.7 | 2.65 |
|  | 14.4 | 18.9 | 2.59 |
|  | 14.5 | 19.2 | 2.58 |

These analyses correspond to B:N:H (hydrolyzable) ratios of 1.00:0.99:1.94; 1.00:0.91:1.93 and 1.00:1.02:1.83 as compared with the theoretical 1.00:1.00:2.00.

The molecular weight of this compound was determined by the depression of the freezing point of benzene. Values of 125, 132 and 136 were obtained comparing favorably with the calculated value of 142 for dimeric monoisopropylaminoborane. About 10 percent of the boron originally charged was recovered as monoisopropylaminoborane.

Example I

A sample of 0.0383 grams (0.540 millimole) of the monoisopropylaminoborane was placed in the bottom of the modified 300 ml. Kjeldahl flask described above. The flask and contents was heated by placing the tube in a cold furnace completely surrounding the flask and bringing the temperature to about 300° C. over a period of about one hour and then allowing to cool.

On opening the reaction tube, 0.467 millimole of hydrogen was collected compared with the theoretical 0.540 millimole. The residual solid polymer contained on analysis 0.48 millimole of boron and 0.47 millimole of nitrogen corresponding to the formula $(C_3H_7NBH)_x$.

The product formed by slow heating was a clear viscous oil at elevated temperatures (e. g. 300° C.) cooling to a glass at room temperature. It was stable in air and quite insoluble in distilled water or dilute hydrochloric acid without the evolution of any gaseous products. Hydrolysis with concentrated hydrochloric acid proceeded slowly at 100° C. The polymer eventually dissolved presumably by chemical reaction.

Example II

Another portion of the monoisopropylaminoborane amounting to 0.0398 gram (0.561 millimole) was heated in a sealed tube by inserting the pyrolysis tube in a preheated furnace for about 5 to 10 minutes at 300° C. The hydrogen evolved amounted to 0.496 millimole compared with a theoretical of 0.561 millimole and the product contained 0.52 millimole of boron and 0.49 millimole of nitrogen compared with theoretical values for the formula $(C_3H_7BNH)_x$ of 0.561 each. The product comprised large opaque crystals which were stable in air, quite insoluble in distilled water or dilute hydrochloric acid, without evolution of any gaseous product. On hydrolysis with concentrated hydrochloric acid at 100° C., the polymer eventually dissolved presumably by chemical reaction.

*Example III*

By the procedure of Example I, 0.0675 gram of monoisopropylaminoborane (0.952 millimole) was heated quickly to 300° C. for a few minutes. The hydrogen evolved amounted to 0.84 millimole compared with a theoretical requirement of 0.952 millimole. The product contained 0.89 millimole of boron and 0.87 millimole of nitrogen compared with a theoretical requirement based on the formula $(C_3H_7BNH)_x$ of 0.952 millimole. The same product as described in Example II was obtained.

We claim:

1. As new compositions of matter, normally solid polymers of monoisopropylaminoborane having the empirical formula $C_3H_7NBH$ and obtained by heating monoisopropylaminoborane to a temperature of about 250°–350° C., which polymers are characterized by stability in air and insolubility in water and dilute hydrochloric acid.

2. As a new composition of matter, a normally solid crystalline polymer of monoisopropylaminoborane having the empirical formula $C_3H_7NBH$ and obtained by heating monoisopropylaminoborane to a temperature of about 250°–350° C. within a period of about 5 to 15 minutes.

3. As a new composition of matter, a normally solid amorphous polymer of monoisopropylaminoborane having the empirical formula $C_3H_7NBH$ and obtained by heating monoisopropylaminoborane to a temperature of about 250°–350° C. within a period of about 45 to 75 minutes.

4. A method for preparing normally solid polymers of monoisopropylaminoborane having the empirical formula $C_3H_7NBH$ which comprises heating monoisopropylaminoborane to a temperature of about 250° to 350° C.

5. A method for the preparation of a normally solid crystalline polymer of monoisopropylaminoborane having the empirical formula $C_3H_7NBH$ which comprises heating monoisopropylaminoborane to a temperature of about 250°–350° C. within a period of about 5 to 15 minutes.

6. A method for the preparation of a normally solid amorphous polymer of monoisopropylaminoborane having the empirical formula $C_3H_7NBH$ which comprises heating monoisopropylaminoborane to a temperature of about 250°–350° C. within a period of about 45 to 75 minutes.

No references cited.